United States Patent [19]
Mitchell

[11] 3,774,472
[45] Nov. 27, 1973

[54] VIBRATION DAMPENER
[75] Inventor: Wallace F. Mitchell, Arlington Heights, Ill.
[73] Assignee: Ammco Tools, Inc., North Chicago, Ill.
[22] Filed: Oct. 2, 1972
[21] Appl. No.: 294,414

[52] U.S. Cl. .................................. 74/574, 188/1 B
[51] Int. Cl. ............................................. F16f 15/12
[58] Field of Search ................... 74/574; 188/1 B, 188/218 A

[56] References Cited
UNITED STATES PATENTS
2,505,031    4/1950   Dach .................................. 188/1 B FOREIGN PATENTS OR APPLICATIONS
519,010    11/1955   Canada .......................... 188/218 A

*Primary Examiner*—Charles J. Myhre
*Assistant Examiner*—F. D. Shoemaker
*Attorney*—Raymond E. Fidler et al.

[57] ABSTRACT

A vibration dampener for use on rotors such as brake discs during machining operations thereon is made up of a plurality of interconnected, identical links each having a workpiece engaging lead block forming a chain of adjustable length, and a spring interconnecting the two end links.

6 Claims, 4 Drawing Figures

PATENTED NOV 27 1973  3,774,472

VIBRATION DAMPENER

The present invention relates in general to vibration dampeners of the type commonly known as silencer bands which are placed on the rim of a rotor to inhibit vibration thereof during machining and other metal removal operations on the rotor.

BACKGROUND OF THE INVENTION

In order to prevent a thin rotor from vibrating or chattering during metal removal operations thereon it is known to place on the periphery of the rotor a flexible band having a plurality of lead blocks fixed thereto for engagement with the rim of the rotor. Such a band is disclosed in U.S. Pat. No. 3,611,830 issued Oct. 12, 1971 and assigned to the same assignee as the present invention. Because of the many different sizes of brake discs now being used, it is necessary that several different sizes of such prior art bands be kept on hand. Also, it has been found that such bands are frequently damaged by careless handling and the springs are sometimes stretched beyond their elastic limits when such a band is used on too large a disc.

OBJECTS OF THE INVENTION

Therefore, an object of the present invention is to provide a new and improved vibration dampener of the silencer band type.

Another object of this invention is to provide a silencer band which is adjustable in length.

A further object of this invention is to provide a new and improved silencer band which, if damaged, can be quickly and easily repaired.

SUMMARY OF THE INVENTION

Briefly, the above and further objects may be realized in accordance with the present invention by providing a plurality of separate, interconnectable links and a spring, at least some but preferably all of the links having rim engaging lead block portions. In use, a selected number of the links are interconnected to form a chain of desired length whose ends are mutually connected by a spring. Accordingly, the larger the diameter of the rotor the greater the number of links which are used, whereby any size of rotor may be accommodated without overstraining the spring. Moreover, should one or more of the links or the spring be damaged, they may be readily replaced without having to discard the entire band. Operationally, the large number of lead blocks are particularly effective in eliminating vibration because of the large number of dampening areas.

BRIEF DESCRIPTION OF THE DRAWING

Further objects and advantages and a better understanding of the invention may be had from the following detailed description taken in connection with the accompanying drawing, wherein.

DETAILED DESCRIPTION OF THE DRAWING

Figure 1:
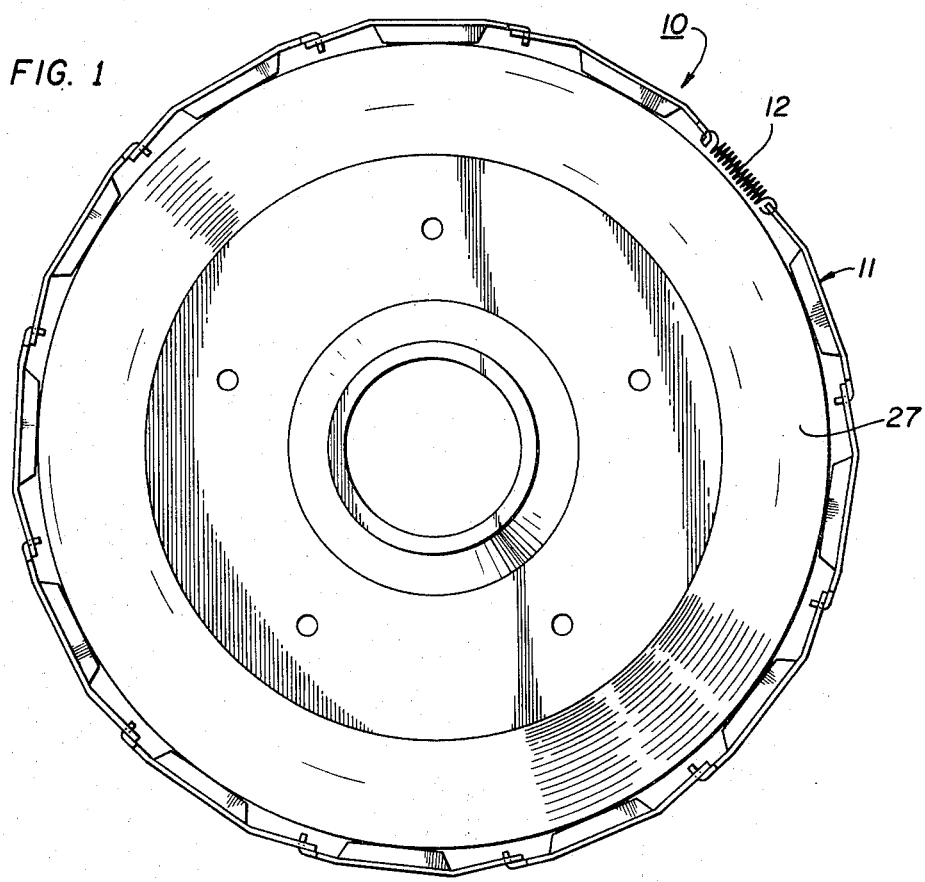
FIG. 1 is an elevational view of a silencer band embodying the present invention operatively affixed to a brake disc.
Figure 2:
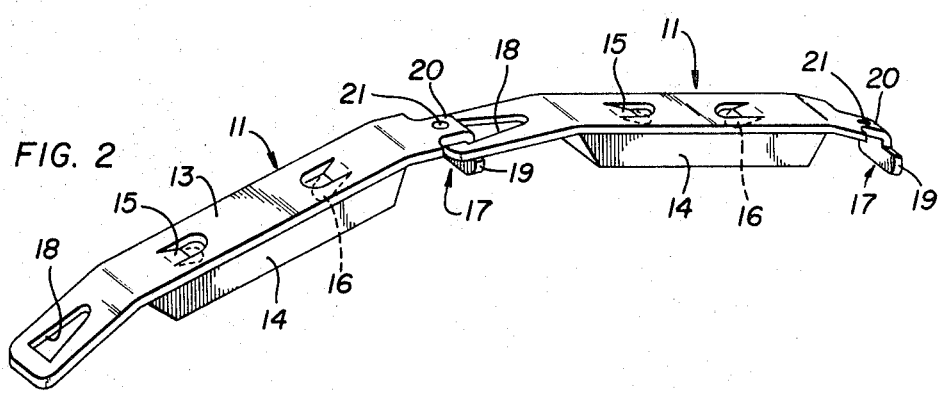
FIG. 2 is an enlarged perspective view showing two of the interlocking links of the band shown in FIG. 1.
Figure 3:
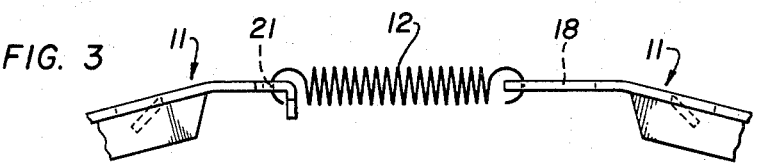
FIG. 3 is an enlarged elevational view of a portion of the band showing the manner in which a spring is incorporated in the band of FIG. 1.

Referring to FIGS. 1–3, a vibration dampener or silencer band 10 is in the form of a chain consisting of a plurality of identical interlocking link members 11 and a tension spring 12. As best shown in FIG. 2, each link member 11 includes a rigid, platelike member 13 to which a soft metal block 14 is affixed. More particularly, the member 13 includes a pair of struck-out tongues 15 and 16 over which the metal block 14 is cast. Preferably, the member 13 is a steel stamping and the block 14 is lead.

The respective links 11 are interlocked by means of tongues 17 provided at one end of each link and which fit into a slot 18 provided at the opposite end of the next adjacent link. The slot 18 is triangularly shaped and elongated along the longitudinal axis of the member 13 to receive the distal end portion 19 of the adjacent link. The end portion 19 has a width dimension slightly less than the longitudinal dimension of the slot 18 and is insertable therein when the adjacent links are oriented at about 90° relative to one another. The end portion 19 is in a plane which intercepts the median axis of the member 13 at approximately 90°, and the tongue 17 has an intermediate portion 20 having a width less than the base width of the slot 18.

The two ends of the chain formed by the links 11 are interconnected by the coil spring 12 which has one end inserted in the slot 18 at one end of the chain and its other end inserted in an aperture 21 in the tongue portion 17 of the last link at the other end of the chain.

Figure 4:
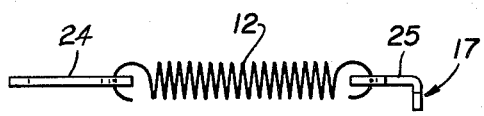
FIG. 4 is an enlarged elevational view of an alternative manner of incorporating a spring in the band of FIG. 1.

In the embodiment of the invention illustrated in FIG. 4, a pair of chain connector links 24 and 25 are provided. The link 24 is provided with a hole at one end through which the spring 12 connects and a triangular hole or slot identical to the slots 18 for receiving the lug 19 at one end of the chain. The connector link 25 has a hole receiving one end of the spring 12 and a tongue portion 17 for insertion in the slot 18 at the other end of the chain.

OPERATION

The silencer band 10 is marketed in unassembled condition with a sufficient number of links for forming the largest diameter band required for use with passenger cars or trucks. The mechanic thus selects and uses the number of links required to form the proper size band for the disc or rotor being machined. Once assembled, the links will not be spuriously separated although links may be removed or added as needed. Having formed the proper sized chain and interconnected the ends thereof with the spring 12, the mechanic places the band on the rim of a rotor 27 with the blocks 14 in engagement therewith to dampen any vibrations generated during subsequent rotation and machining. The spring 12 is slightly stretched as shown in FIG. 1 to resiliently bias the blocks 14 against the rotor and to secure the band in place thereon.

The silencer band 10 thus eliminates the need to excessively stretch the spring 12 and enables the use of the band with substantially all sizes of rotors by merely adding or removing links therefrom. Moreover, any damaged link may be readily replaced rather than having to replace the entire band as was previously necessary when a portion thereof was damaged.

While the present invention has been described in connection with particular embodiments thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A vibration dampener for mounting on rotors to inhibit vibration thereof, comprising
   a plurality of separate link members having mutually interconnectable end portions whereby said link members may be removably connected together to form a flexible chain, and
   a tension spring adapted to be connected between the end links of said chain,
   said link members each having a lead block fixedly connected to one side thereof for engagement with a circumferential portion of said rotor.

2. A vibration dampener according to claim 1, wherein,
   each of said link members includes a portion embedded in the associated lead block.

3. A vibration dampener according to claim 2, wherein
   each lead block is molded on the respective link member.

4. A vibration dampener according to claim 1, wherein each of said link members comprises
   an elongated part having a central portion to the bottom side of which the associated lead block is connected,
   the end portions of said part depending downwardly at a slight angle from the bottom of said central portion.

5. A vibration dampener according to claim 1, wherein
   each of said link members is provided with a longitudinal slot at one end and a T-shaped connector at the other end.

6. A vibration dampener according to claim 4, wherein
   said T-shaped connector portion lies in a plane which is substantially perpendicular to the longitudinal axis of the link member.

* * * * *